(12) United States Patent
Crawford-Taylor et al.

(10) Patent No.: US 10,457,018 B2
(45) Date of Patent: Oct. 29, 2019

(54) DECORATIVE AND/OR SECURE ELEMENT FOR HOMOGENEOUS CARD CONSTRUCTION

(75) Inventors: Shannon K. Crawford-Taylor, Merrillville, IN (US); Daniel M. Szumski, Saint John, IN (US)

(73) Assignee: Illinois Tool Works Inc., Glenview, IL (US)

( * ) Notice: Subject to any disclaimer, the term of this patent is extended or adjusted under 35 U.S.C. 154(b) by 1308 days.

(21) Appl. No.: 13/295,908

(22) Filed: Nov. 14, 2011

(65) Prior Publication Data

US 2012/0295089 A1 Nov. 22, 2012

Related U.S. Application Data

(60) Provisional application No. 61/413,720, filed on Nov. 15, 2010.

(51) Int. Cl.
*B32B 15/08* (2006.01)
*B32B 27/32* (2006.01)
*B32B 27/30* (2006.01)
*B32B 27/36* (2006.01)
*B32B 27/34* (2006.01)
(Continued)

(52) U.S. Cl.
CPC .............. *B32B 15/08* (2013.01); *B32B 27/28* (2013.01); *B32B 27/304* (2013.01); *B32B 27/306* (2013.01); *B32B 27/32* (2013.01); *B32B 27/34* (2013.01); *B32B 27/36* (2013.01); *B42D 25/328* (2014.10); *B42D 25/425* (2014.10); *B32B 7/02* (2013.01); *B32B 7/027* (2019.01); *B42D 25/324* (2014.10); *B42D 25/373* (2014.10); *B42D 25/455* (2014.10); *B42D 25/46* (2014.10); *B42D 25/47* (2014.10); *B42D 25/475* (2014.10); *B42D 2033/10* (2013.01); *B42D 2033/18* (2013.01); *B42D 2033/30* (2013.01);
(Continued)

(58) Field of Classification Search
CPC ....... B32B 15/08–15/09; B42D 15/10–15/105; B42D 2031/20–2031/30; B42D 2033/00–2033/46
USPC .................. 428/212–220, 195.1, 201, 411.1, 428/457–463, 474.4–476.9, 477.7–478.4, 428/480–483, 500, 507–510, 515–523, 428/532–534, 29; 359/1–4; 283/72–114
See application file for complete search history.

(56) References Cited

U.S. PATENT DOCUMENTS 4,497,872 A * 2/1985 Hoppe ................... B42D 25/00
283/107
4,591,904 A 5/1986 Urabe et al.
(Continued)

FOREIGN PATENT DOCUMENTS

CN 201540585 U 8/2010
CN 101084124 B 9/2013
(Continued)

OTHER PUBLICATIONS

Machine Translation of EP1386753. Retrieved Oct. 1, 2014.*
(Continued)

*Primary Examiner* — Prashant J Khatri
(74) *Attorney, Agent, or Firm* — Levenfeld Pearlstein, LLC

(57) ABSTRACT

A laminate sheet includes a base film formed from a recyclable, biodegradable, degradable, and/or compostable material, a metal or reflective film layer disposed over the base film, and heat resistant layer disposed over the base film.

13 Claims, 2 Drawing Sheets

(51) Int. Cl.
  *B42D 25/425* (2014.01)
  *B42D 25/328* (2014.01)
  *B42D 25/373* (2014.01)
  *B32B 7/027* (2019.01)
  *B32B 7/02* (2019.01)
  *B42D 25/455* (2014.01)
  *B42D 25/324* (2014.01)
  *B42D 25/46* (2014.01)
  *B42D 25/47* (2014.01)
  *B42D 25/475* (2014.01)
  *B32B 27/28* (2006.01)

(52) U.S. Cl.
  CPC ... *B42D 2033/32* (2013.01); *Y10T 428/31678* (2015.04); *Y10T 428/31692* (2015.04)

(56) References Cited

U.S. PATENT DOCUMENTS

| | | | |
|---|---|---|---|
| 5,051,314 | A | 9/1991 | Ichikawa et al. |
| 5,104,471 | A | 4/1992 | Antes et al. |
| 6,644,552 | B1 * | 11/2003 | Herslow ............ B32B 27/08 235/488 |
| 7,503,503 | B2 * | 3/2009 | Riedl et al. ............ 235/488 |
| 7,544,266 | B2 | 6/2009 | Herring et al. |
| 2002/0191234 | A1 | 12/2002 | Ishimoto et al. |
| 2003/0127847 | A1 | 7/2003 | Keller et al. |
| 2005/0257880 | A1 | 11/2005 | Herring et al. |
| 2007/0195387 | A1 | 8/2007 | Weyermann et al. |
| 2008/0245865 | A1 | 10/2008 | Mosteller |
| 2009/0169776 | A1 | 7/2009 | Herslow |
| 2010/0021740 | A1 * | 1/2010 | Tanaka et al. ............ 428/412 |
| 2010/0035032 | A1 * | 2/2010 | Aigner ............ B32B 15/08 428/209 |

FOREIGN PATENT DOCUMENTS

| | | | | |
|---|---|---|---|---|
| EP | 1386753 | A1 * | 2/2004 | ............ B42D 15/10 |
| JP | 5201152 | A | 8/1993 | |
| WO | 9527925 | A1 | 10/1995 | |
| WO | 0162516 | A1 | 8/2001 | |
| WO | 2006/022695 | A1 | 3/2006 | |
| WO | WO 2007054343 | A2 * | 5/2007 | ............ B32B 15/08 |
| WO | WO 2008129833 | A1 * | 10/2008 | |

OTHER PUBLICATIONS

International Search Report and the Written Opinion of the International Searching Authority issued in connection with PCT/US2011/060800 dated May 14. 2012.

* cited by examiner

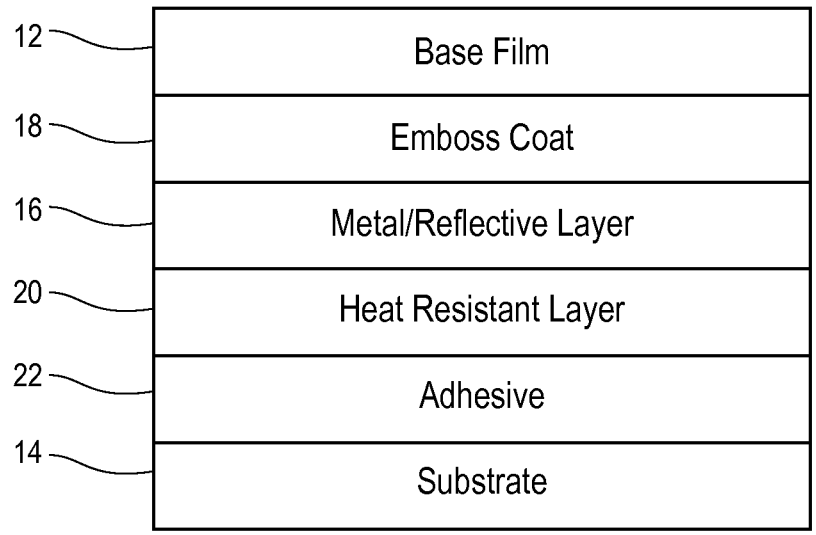
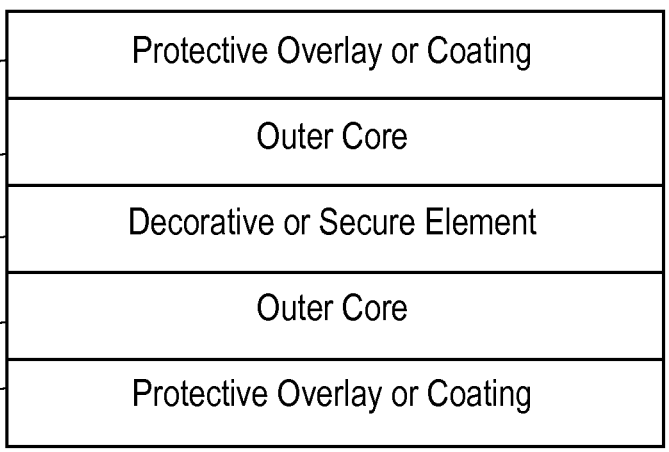

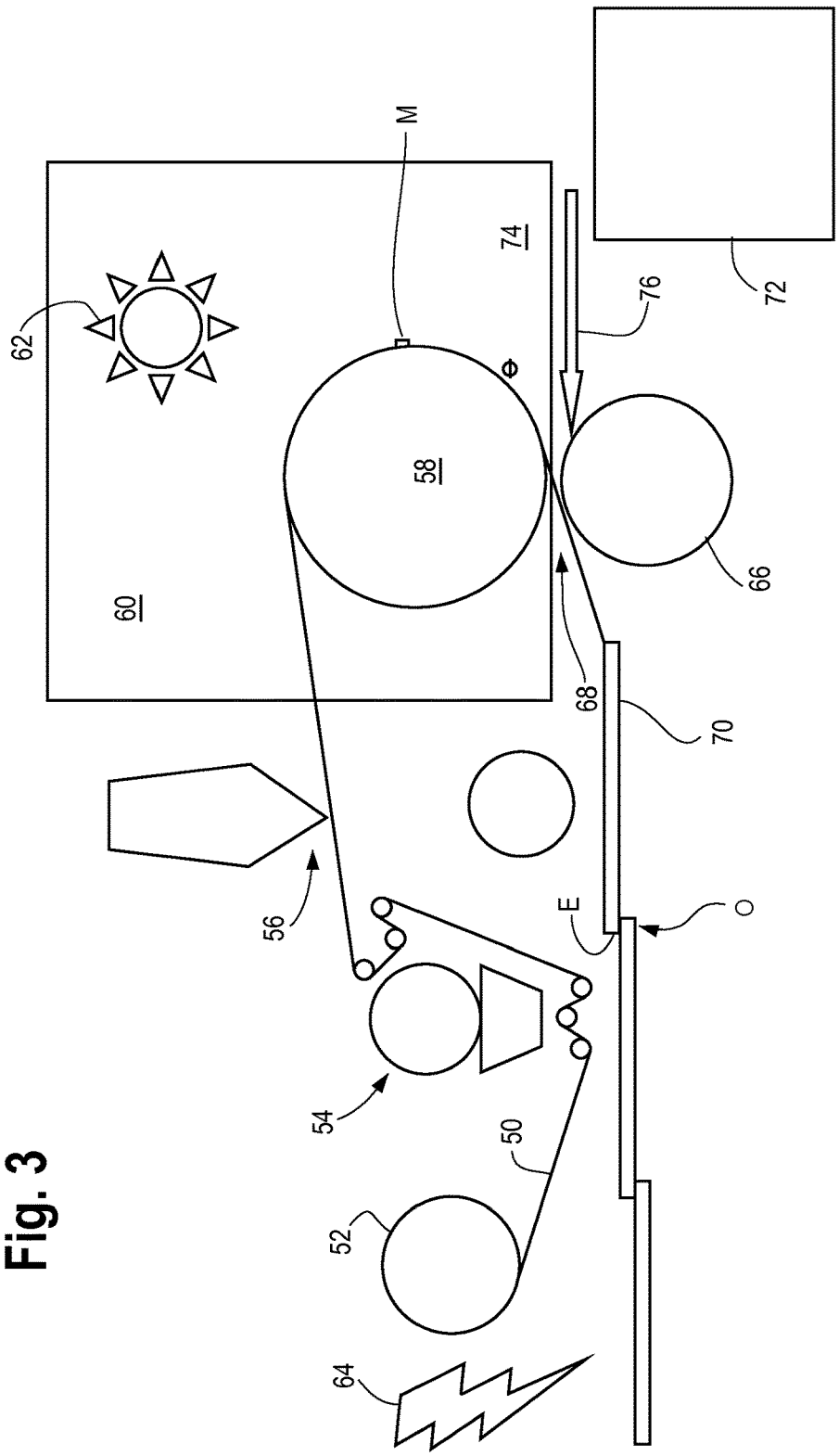

DECORATIVE AND/OR SECURE ELEMENT FOR HOMOGENEOUS CARD CONSTRUCTION

CROSS-REFERENCE TO RELATED APPLICATION DATA

This application claims the benefit of priority of U.S. Provisional Patent Application Ser. No. 61/413,720, filed Nov. 15, 2010, the disclosure of which is incorporated herein in its entirety.

BACKGROUND

Generally, laminated sheets and cards that contain holographic, metallic, and/or reflective features are constructed from multiple layers of chemically different materials, such as plastic or paper based substrates, films or foils that are holographic, metallized, reflective, printed, or clear, adhesives, and other coatings. Laminated sheets and cards may also include printing, graphics, additional holographic elements, security inks, and other features. Typical uses of laminated sheets include use in packaging, signage, displays, and the like. Laminated sheets can also be used to produce laminated and non-thermally laminated cards, such as credit cards, identification cards, phone cards, key cards, gift cards, etc.

Commonly, full face metallic and holographic cards are made with a metallic or holographic polyethylene terephthalate ("PET") film laminated into or onto a polyvinyl chloride ("PVC"), acrylonitrile butadiene styrene terpolymer ("ABS"), or polycarbonate ("PC") card body or substrate. However, the different material characteristics of the film, card body, and/or substrate prevent the cards and skeletons from which the cards are die cut from being readily recyclable, biodegradable, degradable, or compostable.

Other issues arise in the production of these laminated cards, which must ultimately meet certain standards with respect to peel strength or resistance to delamination, for example, for practical use. Defects such as bubbles or wrinkles between layers, orange peel, warping, curling, or bowing of the final laminated cards may occur during or after the manufacturing process. Warping, for example, may occur as a result of a roll laminating process, wherein rolls of material that make the layers are adhered together as they are unrolled, coated, and fed into a lamination press with unbalanced tension. Further, such roll-to-roll laminating typically includes heavier plastic materials that are wound up and thus take on roll set curl.

Within a composite or mixed material card, a balanced, symmetrical construction is commonly required in order to prevent curling or bowing in laminated cards. For example, in a symmetrical construction, even if only one side of the card requires a laminated PET film, such as a metallized film or reflective surface, the opposite side of the composite construction will include a matching PET film type. Accordingly, one such known card laminate comprises a split core substrate of two adjacent layers of 12 mil (300 micron) white PVC copolymer core stock. Laminated to one side of each of the PVC split cores is 0.75 gauge (19 micron) or 0.92 gauge (23 micron) PET holographic, metallized, brushed, coated, printed, or clear film, with or without a tie coat. A tie coat or primer may be used to improve the bond between the adhesive and the metallized surface of the film. This lamination involves a roll-to-roll lamination process.

The above-described card laminate has various drawbacks, for example, PVC in roll form due to roll set curl can cause sheet curl and rippled edges, printed sheets can curl or exhibit other dimensional instabilities when heated in a drying oven or under UV lights, and PVC in roll form may limit certain product constructions. The roll-to-roll laminating process may further require specialty sheeting to achieve registered imagery, heavier adhesive coat weights that can create visual defects, and a final lamination cycle to activate adhesive and achieve peel strength requirements for typical end uses, such as ANSI/ISO specifications.

The laminate sheets and cards of the present disclosure, however, overcome one or more of the problems and disadvantages of prior art laminate sheets and cards.

SUMMARY

According to one example, a laminate sheet includes a base film formed from a recyclable, biodegradable, degradable, and/or compostable material, a metal or reflective film layer disposed over the base film, and a heat resistant layer disposed over the base film.

According to another example, a laminate card includes a sheet that includes a base film and a metal or reflective film layer disposed over the base film and one or more of an outer core and a protective overlay disposed over the sheet. The base film and the one or more outer core and protective overlay or coating are formed from recyclable, biodegradable, degradable, and/or compostable materials with similar physical, thermal, and/or stability characteristics.

According to yet another example, a laminate sheet includes a base film, an emboss coat disposed over the base film, a metal or reflective film layer disposed over the emboss coat, a heat resistant layer disposed over the metal or reflective film layer, an adhesive layer disposed over the heat resistant layer, and a substrate disposed over the adhesive layer. The base film and the substrate are formed from recyclable, biodegradable, degradable, and/or compostable materials with similar physical, thermal, and/or stability characteristics.

BRIEF DESCRIPTION OF THE DRAWINGS

Other aspects and advantages of the present disclosure will become apparent upon reading the following detailed description and upon reference to the drawings in which:

FIG. 1 is a diagrammatic cross-sectional view of a laminate sheet according to one example;

FIG. 2 is a diagrammatic cross-sectional view of a card construction, according to another example, utilizing the laminate sheet of FIG. 1; and FIG. 3 is an illustration of one embodiment of a method for making a card construction.

DETAILED DESCRIPTION

While the present disclosure is susceptible of implementation in various forms, there is shown in the drawings and will hereinafter be described one or more examples with the understanding that the present disclosure is not intended to limit the spirit and scope of the disclosure and/or potential claims to the example(s) illustrated and discussed.

Referring to FIG. 1, a laminate sheet 10 includes a base film 12 that is recyclable, biodegradable, degradable, or compostable. Examples of films that may comprise the base film 12 include: PVC films; polyolefin ("PO") films; polyvinyl alcohol ("PVOH") films; polystyrene ("PS" and "HIPS") films; PET, glycol modified polyethylene terephthalate ("PETG"), and other recyclable, biodegradable, degradable, and/or polyester based films; polycaprolactone ("PCL") films; films with anhydride or amide linkages in the polymer backbone; films made from synthetic polymers containing additives that promote degradation; polylactide ("PLA") films; polyhydroxyalkonates ("PHA") films; cellulosic, starch, chitosan, and protein based films, and/or other known recyclable, biodegradable, degradable, or compostable films. The base film 12 may be disposed over a substrate layer 14 formed from one or more of the same materials as the base film 12 listed above, such that the film 12 and the layer 14 are formed from materials with similar physical, thermal, and/or stability characteristics to create a laminate sheet 10 that is homogenous in composition. Such physical characteristics may include, for example, tensile strength, elongation or stretch capability, Young's modulus, density, hardness, and crystallinity. Examples of thermal characteristics may include thermal shrinkage and expansion properties, vicat hardness, glass transition temperature range, melting point, and viscosity. Further, some examples of stability characteristics may include susceptibility to enzymatic, photolytic, thermal-oxidative, and/or chemical degradation. By way of non-limiting example, a sheet 10 that is homogenous in composition may include a base film 12 and a substrate layer 14 that are both formed from one or more of the same materials, e.g., PVC, PO, PVOH, PET, etc.

The base film 12 may be layered directly over the substrate 14 using any known process or method. However, as seen in FIG. 1, the sheet 10 may also include a metal or reflective layer 16 disposed between the base film 12 and the substrate 14. The metal or reflective layer 16 may include aluminum, titanium oxide, zirconium oxide, zinc sulfide, and the like, to produce a desired visual effect or security feature for the sheet 10. In one example, the base film and/or the metal or reflective layer 16 are embossed to produce metallic or holographic images. Alternatively or in combination, an additional coat 18 is disposed between the base film 12 and the metal or reflective layer 16 and is embossed to produce metallic or holographic images.

Further, the sheet 10 may include a heat resistant layer 20 and/or an adhesive layer 22 disposed between the layers 12 and 14. The heat resistant layer 20 may include a coating that is radiation cured or cross-linked via ultraviolet ("UV") light or electron beam ("EB") radiation, for example. In addition, the heat resistance layer 20 can be chemically and/or thermally cured or cross-linked, be a thermoplastic polymer with a high temperature thermal transition, such as a high glass transition temperature ("$T_g$"), or a polymer reinforced with inorganic material. The heat resistant layer 20 can be included so that metallic or holographic images, such as those incorporated into the layers 12, 16, and/or 18, can better withstand thermal lamination cycles during card manufacturing processes. Further, the adhesive layer 22 can include known adhesive films, heat seals, hot melts, water-based, solvent based, and radiation curable adhesives, and the like.

In FIG. 1, the layers 12, 18, 16, 20, 22, and 14 are illustrated as being layered in successive order. However, in other embodiments fewer or additional layers can be included in any suitable order, as would be apparent to one of ordinary skill. In one example, the substrate 14 is omitted and the sheet 10 includes the base film 12 and one or more of the layers 18, 16, 20, and 22.

Referring now to FIG. 2, a card 40 according to one example includes the sheet 10 of FIG. 1 disposed between first and second outer cores 42, 44, respectively, and first and second protective overlays or coatings 46, 48, respectively, disposed over the outer cores. In one example, the outer cores 42, 44 and overlays 46, 48 are formed of recyclable, biodegradable, degradable, or compostable films with similar physical, thermal, and/or stability characteristics as the base film 12 and the substrate 14, if present, to form a homogenous card that is readily recyclable, biodegradable, degradable, or compostable. The similarity of physical, thermal, and/or stability characteristics may be influenced by the intended handling of the sheet 10 and/or card 40 at the end of its life cycle. For example, if the sheet 10 and/or card 40 are intended to be recycled, it may be important for physical and thermal characteristics of the films to be similar. In another example, if the sheet 10 and/or card 40 are intended to be biodegradable, it may be important for the enzymatic stability characteristics of the films to be similar.

Referring back to FIG. 2, in other examples, one or more of the cores 42, 44 and overlays 46, 48 may be omitted from the construction of the card 40. In yet another example, one or both of the overlays 46, 48 can be replaced with a varnish or lacquer coating instead of a separate overlay film layer. Further, the sheet 10 and/or the card 40 can include printing or have other features added to any layer or surface thereof.

According to one example, the card 40 has a finished thickness of less than or equal to about 33 mils, which is the typical thickness for many types of transaction cards. In one non-limiting example, the sheet 10 has a thickness of about 10 mils, each of the outer cores 42, 44 has a thickness of about 8 mils, and each of the protective overlays or coatings 46, 48 has a thickness of about 2 mils.

In another example, the sheet 10 has a thickness of about 2 mils, each of the outer cores 42, 44 has a thickness of about 12 mils, and each of the protective overlays or coatings has a thickness of about 2 mils. In the present example, the sheet 10 having a thickness of about 2 mils may omit the substrate layer 14.

The arrangement and thicknesses of each of the layers of the sheet 10 and the card 40 can be modified to suit any desired application, as would be apparent to one of ordinary skill in the art.

As discussed above, typical full face holographic or security cards are formed from numerous layers of materials having different physical, thermal, and/or stability characteristics. In one embodiment of the present disclosure, the various layers that make up the body of the card 40 are composed of similar polymeric materials with similar physical and thermal characteristics. This construction results in less stress locked into the cards during thermal lamination and further reduces the likelihood of cards being bowed, curled, warped, or distorted in some way. The homogenous construction of the sheet 10 and card 40 also eliminates the need for symmetry in the sheet and card. This ability to implement non-symmetrical card constructions allows the sheet 10 and the card 40 to include fewer layers than prior known films and cards, thereby resulting in a less complex design and manufacturing process. Still further, the sheet 10 and card 40 disclosed herein has been found to have an improved appearance with minimal defects, such as orange peel, and at the same time provides a laminate with good peel strength and resistance to delamination.

The sheet 10 and card 40 can be manufactured using any known processes. However, in one example, such as that illustrated in FIG. 3, the sheet 10 and card 40 are manufactured using a roll-to-sheet lamination process, such as the process discussed in Herring et al. U.S. Pat. No. 7,544,266 ("Herring"), which is hereby incorporated by reference in its entirety. In the roll-to-sheet process, for example, a film 50, which may have applied thereto a variety of layered security, functional and/or decorative features, is unrolled from a supply 52 and is passed through a coating station 54, in which the film 50 is coated in-line with a laminating adhesive, as at 56. The coated film next passes around a heated drum 58 in an oven 60, where the adhesive coated film is dried. Alternatively, in place of the coating station, a heat seal adhesive is pre-coated onto the film, and then activated by the oven and heated drum. In another embodiment, the adhesive can be radiation curable, and in place of drying the adhesive in the oven, the adhesive is cross-linked by exposing it to a UV light (for example, as at 62) prior to or after lamination, or by irradiating the sheets with an EB source (for example, as at 64) after lamination. In yet another embodiment, the film can be coated in-line with a hot melt adhesive via a hot melt/extrusion die.

A backing roller 66 is located proximate the oven and heated drum to form a laminating nip 68. A sheet 70 from a generally flat stack of sheets 72 of the substrate or core stock are suitably supported adjacent the backing roller. The sheets are fed into the laminating nip 68 by any suitable sheet feeding mechanism and/or conveyor system, as is known in the art of sheet feeding. As the sheets 70 are fed into the laminating nip 68, a registration unit 74 registers the sheets 70 with the film 50.

In one example, the film includes a distinguishing mark M, imagery, and/or running line. The registration unit reads the imagery, registration mark, or line and registers it to the individual sheets 70 by synchronizing the feeding of the sheets 70 with the passage of the film 50 into the nip 68. More specifically, as the film 50 travels around drum 58, the sheets 70 are carried on a conveyor 76 towards the lamination nip 68 (point between the drum 58 and the backing roller 66). The registration unit 74 detects the eye mark or image M on the film 50 and signals a drive to adjust the positioning of the sheet 70 so that the registration mark M is placed on the leading edge E of sheet 70 or other desired, repeatable position.

After registration, the film 50 is then laminated onto the sheets 70 as they pass through the nip 68 in register, thus producing improved sheets or card laminate. The sheets or card laminate are then separated, for example, by cutting or notching the film with a moving blade (not shown) at the point where the adjacent sheets overlap, as at O, or notching the film with a perforation wheel and propagating a tear or cut, and stacked. Any suitable cutting and/or separating devices may be used as is known in the art. The film can be laminated such that the holographic, metallized (vapor deposited metals or other compounds), brushed, coated or printed, with or without tie coats side of the film is coated with the adhesive. It should be understood however that the film can be laminated with the above features facing up, down, or those features may be on both sides of the film to be laminated.

In an alternate embodiment, the film is a hot stamp or cold transfer product. An adhesive is applied (with total or partial or pattern coverage) and cured via one of the above described methods, if applicable. The sheet is then registered and fed in synch with the film into the lamination nip. In this instance, the adhesive removes selective portions or all of the coating or coatings from the film, effectively transferring, in register, the coating(s) or selective portions thereof to the sheets. After transfer of the coating(s) or portions thereof, the spent film is removed from the sheets and wound onto a rewind drum. The laminated/decorated sheets may then be collected and stacked.

The process described above and in more detail in Herring can be modified and adapted to produce the sheet 10 and card 40 describe herein, as would be apparent to one of ordinary skill in the art.

Other embodiments include all of the various combinations of individual features of each of the embodiments described herein.

In the disclosure, the words "a" or "an" are to be taken to include both the singular and the plural. Conversely, any reference to plural items shall, where appropriate, include the singular.

From the foregoing, it will be observed that numerous modifications and variations can be effectuated without departing from the spirit and scope of the novel concepts of the present disclosure. It is to be understood that no limitation with respect to the specific embodiments presented is intended or should be inferred. The disclosure is intended to cover by the appended claims all such modifications as fall within the scope of the claims.

What is claimed is:

1. A laminate sheet, comprising:
    a base film formed from one or more of a recyclable, biodegradable, degradable, and compostable material, the base film having a first side facing in a first direction;
    a metal or reflective film layer disposed over the first side of the base film;
    a heat resistant layer disposed over the metal or reflective film in the first direction;
    an emboss coat disposed directly over the base film and between the base film and the metal or reflective film layer, the emboss coat embossed to produce metallic or holographic images; and
    a substrate disposed over the heat resistant layer in the first direction,
    wherein the base film and substrate are positioned as respective outermost layers on opposite sides of the laminate.

2. The sheet of claim 1, wherein the base film and the substrate are formed from one or more of a recyclable, biodegradable, degradable, and compostable material with similar physical, thermal, and/or stability characteristics.

3. The sheet of claim 2, wherein the base film and the substrate are formed from polyvinyl chloride ("PVC"), polylactide ("PLA"), polyethylene terephthalate ("PET"), glycol modified polyethylene terephthalate ("PETG"), polyolefin ("PO"), polyvinyl alcohol ("PVOH"), polystyrene ("PS" and "HIPS"), polycaprolactone ("PCL"), films one or more of anhydride and amide linkages in the polymer backbone, films made from synthetic polymers containing additives that promote degradation, polyhydroxyalkonates ("PHA"), and/or cellulosic, starch, chitosan, and protein based films.

4. The sheet of claim 2, wherein the base film and the substrate are formed in a roll-to-sheet lamination process.

5. The sheet of claim 2, further comprising an adhesive layer disposed between the heat resistant layer and the substrate.

6. The sheet of claim 1, wherein the heat resistant layer is at least one of a radiation, chemically, and thermally cured or cross-linked layer, a thermoplastic polymer, and a polymer reinforced with inorganic material.

7. A laminate card, comprising:
    a sheet comprising a plurality of layers including a base film, an emboss coat disposed over a first side of the base film, a metal or reflective film layer disposed directly over the emboss coat on the first side of the base film, a substrate disposed over the metal or reflective film layer, a heat resistant layer disposed between the substrate and the metal or reflective film layer, and an adhesive layer disposed between the substrate and the heat resistant layer, wherein the base film and substrate are positioned as respective outermost layers on opposite sides of the sheet; and one or more of an outer core and a protective coating disposed over a side of the sheet, wherein the one or more outer core and protective coating includes a first outer core and first protective coating disposed over a first side of the sheet with the first outer core positioned between the first protective coating and the sheet, and a second outer core disposed on a second side of the sheet and a second protective coating disposed over the second outer core, wherein the base film, the substrate, and the one or more outer core and protective coating are formed from one or more of a recyclable, biodegradable, degradable, and compostable material with similar physical, thermal, and/or stability characteristics, and wherein layers of the plurality of layers are non-symmetrically disposed on opposite sides of the emboss coat and the metal or reflective film layer.

8. The card of claim 7, wherein the base film, the substrate, and the one or more outer core and protective coating are formed from polyvinyl chloride ("PVC"), polylactide ("PLA"), polyethylene terephthalate ("PET"), glycol modified polyethylene terephthalate ("PETG"), polyolefin ("PO"), polyvinyl alcohol ("PVOH"), polystyrene ("PS" and "HIPS"), polycaprolactone ("PCL"), films with one or more of anhydride and amide linkages in the polymer backbone, films made from synthetic polymers containing additives that promote degradation, polyhydroxyalkonates ("PHA"), and/or cellulosic, starch, chitosan, and protein based films.

9. The card of claim 7, wherein the base film and the substrate are formed in a roll-to-sheet lamination process and the sheet and the one or more outer core and protective coating are formed in a thermal lamination process.

10. The card of claim 7, wherein the heat resistant layer is at least one of a radiation, chemically, and thermally cured or cross-linked layer, a thermoplastic polymer, and a polymer reinforced with inorganic material.

11. The card of claim 7, wherein the card has a thickness of less than or equal to about 33 mils.

12. A laminate sheet for use in a laminate card, the laminate sheet having a plurality of layers comprising:
a base film having a first side facing in a first direction;
an embossed coat disposed directly over the first side the base film;
a metal or reflective film layer disposed directly over the emboss coat in the first direction to form a metallic or holographic image;
a heat resistant layer disposed directly over the metal or reflective film layer in the first direction;
an adhesive layer disposed directly over the heat resistant layer in the first direction; and
a substrate disposed directly over the adhesive layer in the first direction and adhered directly to the heat resistant layer by the adhesive layer;
wherein the base film and the substrate are formed from the same material and the material is one or more of a recyclable, biodegradable, degradable, and compostable material,
wherein the base film and the substrate each include an outer surface facing away from the embossed coat, metal or reflective film layer, heat resistant layer and adhesive layer such that the respective outer surfaces are open and exposed to define an outer surface of the sheet, and
wherein layers of the plurality of layers are non-symmetrically disposed on opposite sides of the emboss coat and the metal or reflective film layer.

13. The sheet of claim 12, wherein the base film and the substrate are formed from polyvinyl chloride ("PVC"), polylactide ("PLA"), polyethylene terephthalate ("PET"), glycol modified polyethylene terephthalate ("PETG"), polyolefin ("PO"), polyvinyl alcohol ("PVOH"), polystyrene ("PS" and "HIPS"), polycaprolactone ("PCL"), films with one or more of anhydride and amide linkages in the polymer backbone, films made from synthetic polymers containing additives that promote degradation, polyhydroxyalkonates ("PHA"), cellulosic, starch, chitosan, and protein based films, and the heat resistant layer is at least one of a radiation, chemically, and thermally cured or cross-linked coating, a thermoplastic polymer, and a polymer reinforced with inorganic material.

* * * * *